(12) United States Patent
Seidensticker

(10) Patent No.: US 8,288,698 B2
(45) Date of Patent: Oct. 16, 2012

(54) METHOD FOR CORRECTING THE TRAJECTORY OF TERMINALLY GUIDED AMMUNITION

(75) Inventor: Jens Seidensticker, Radolfzell (DE)

(73) Assignee: Rheinmetall Air Defence AG, Zurich (DE)

( * ) Notice: Subject to any disclaimer, the term of this patent is extended or adjusted under 35 U.S.C. 154(b) by 329 days.

(21) Appl. No.: 12/789,607

(22) Filed: May 28, 2010

(65) Prior Publication Data

US 2010/0308152 A1 Dec. 9, 2010

(30) Foreign Application Priority Data

Jun. 8, 2009 (DE) .......................... 10 2009 024 508

(51) Int. Cl.
*F41G 7/24* (2006.01)
*F41G 7/30* (2006.01)
*F41G 7/00* (2006.01)

(52) U.S. Cl. ...... 244/3.11; 244/3.1; 244/3.13; 244/3.14; 244/3.15; 244/3.21; 244/3.22

(58) Field of Classification Search ................... 89/1.11, 89/37.01, 41.01, 41.02, 41.07; 244/3.1–3.3, 244/158.1, 158.2, 164, 166, 171; 342/61, 342/62, 175, 195; 324/300, 304
See application file for complete search history.

(56) References Cited

U.S. PATENT DOCUMENTS

| | | | | |
|---|---|---|---|---|
| 3,765,621 A * | 10/1973 | Shigehara | .................... | 244/3.21 |
| 3,834,653 A * | 9/1974 | Perkel | ........................ | 244/3.21 |
| 4,309,005 A * | 1/1982 | McLean | ....................... | 244/3.16 |
| 4,328,938 A * | 5/1982 | Reisman et al. | ............... | 244/3.1 |
| 4,431,150 A * | 2/1984 | Epperson, Jr. | ............... | 244/3.21 |
| 4,619,421 A | 10/1986 | Trummer | | |
| 4,646,990 A * | 3/1987 | Cleveland, Jr. | ............... | 244/3.21 |
| 4,923,151 A * | 5/1990 | Roberts et al. | ............. | 244/158.2 |
| 4,967,981 A * | 11/1990 | Yff | ................. | 244/3.21 |
| 5,099,246 A * | 3/1992 | Skagerlund | ................... | 244/3.14 |
| 5,131,602 A * | 7/1992 | Linick | .......................... | 244/3.14 |
| 5,163,637 A * | 11/1992 | Hansen | ........................ | 244/3.21 |
| 5,189,368 A * | 2/1993 | Chase | .......................... | 324/304 |
| 5,355,767 A * | 10/1994 | Morita | ......................... | 89/41.07 |
| 5,740,986 A | 4/1998 | Seidensticker et al. | | |
| 5,788,178 A * | 8/1998 | Barrett, Jr. | ................... | 244/3.11 |
| 5,896,106 A | 4/1999 | Seidensticker et al. | | |
| 6,163,021 A * | 12/2000 | Mickelson | ..................... | 244/3.2 |
| 6,223,105 B1 * | 4/2001 | Teague | .......................... | 342/62 |
| 6,345,785 B1 * | 2/2002 | Harkins et al. | ............... | 244/3.23 |
| 6,398,155 B1 * | 6/2002 | Hepner et al. | ............... | 244/3.15 |
| 6,422,507 B1 * | 7/2002 | Lipeles | ........................ | 244/3.13 |

(Continued)

FOREIGN PATENT DOCUMENTS

CH 691 143 A5 4/2001

(Continued)

*Primary Examiner* — Bernarr Gregory
(74) *Attorney, Agent, or Firm* — Muncy, Geissler, Olds & Lowe, PLLC

(57) ABSTRACT

A method for correcting a trajectory of terminally guided ammunition is provided. In order to achieve a high probability of hits, in particular when firing in bursts (continuous fire, rapid single shot fire), it is provided that every individual ammunition is addressed separately. The "imprinting" is performed based on the beam rider guidance principle of terminally guided ammunition. Every individual ammunition reads only the guidance beam identified for this ammunition and can, using additional information, determine its absolute roll attitude in space in order to achieve the proper triggering of the correcting propulsion unit.

5 Claims, 1 Drawing Sheet

U.S. PATENT DOCUMENTS

| | | | |
|---|---|---|---|
| 6,467,722 B1 * | 10/2002 | Berry et al. | 244/3.21 |
| 6,474,593 B1 * | 11/2002 | Lipeles et al. | 244/3.21 |
| 6,493,651 B2 * | 12/2002 | Harkins et al. | 244/3.15 |
| 6,556,896 B1 * | 4/2003 | Meyer | 244/3.1 |
| 6,725,173 B2 * | 4/2004 | An et al. | 244/3.2 |
| 7,341,221 B1 * | 3/2008 | Wilson | 244/3.21 |
| 7,500,636 B2 * | 3/2009 | Bredy | 244/3.15 |
| 7,566,027 B1 * | 7/2009 | Johnson et al. | 244/3.21 |
| 7,989,742 B2 * | 8/2011 | Bredy | 244/3.1 |
| 2007/0074625 A1 | 4/2007 | Seidensticker et al. | |

FOREIGN PATENT DOCUMENTS

| | | |
|---|---|---|
| DE | 28 29 934 A1 | 1/1980 |
| DE | 32 28 461 C2 | 6/1984 |
| DE | 33 42 958 A1 | 6/1985 |
| DE | 35 01 955 A1 | 7/1986 |
| DE | 198 45 611 A1 | 2/2000 |
| EP | 0 742 420 A2 | 11/1996 |
| EP | 0 745 828 A1 | 12/1996 |
| EP | 1 726 911 A1 | 11/2006 |

* cited by examiner

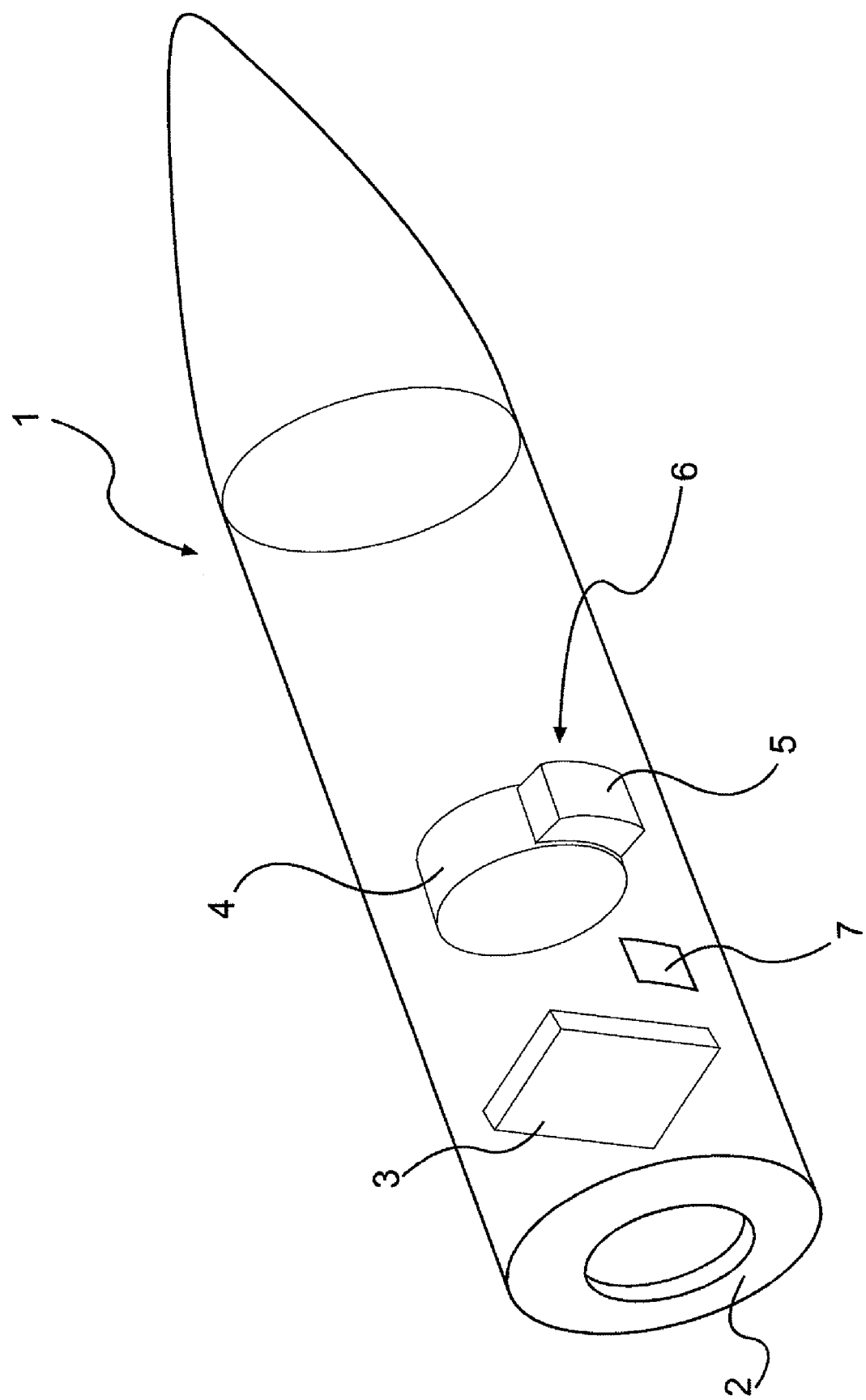

ically guided projectiles or ammunition in the medium caliber range.

2. Description of the Background Art

Guidance in the terminal phase for ammunition fired from a barrel of a weapon is subject to limitations due to various loads during firing. Sensor and guidance elements must have a robust design. In addition, the volume in medium caliber ammunition for installation is limited. Seeker heads with their inertial sensors, in particular, cannot always be housed, especially in medium caliber ammunition, as a payload must also be carried. Therefore space-saving technologies are used, for which semi-active methods have been developed, such as beam rider guidance. In this method, four coded lasers project a pattern to the prescribed trajectory. Based on the areas the tail sensor of the projectile sees, the projectile can determine its individual miss distance from its laser beam.

DE 35 01 955 C2 discloses a target selection method for terminally guided ammunition or guided missiles, respectively. In order to get effective use from such ammunition, it is suggested that the radiation reflected from the presently tracked target be analyzed in a signal receiver in each seeker head to identify whether the signal sent from another seeker head is contained in the analyzed signal or not. If this is the case, the guided missile will seek a new target.

A terminally guided droppable unit for attacking targets emitting acoustic signals is furthermore known from DE 32 28 461 C2. When recognizing a corresponding acoustic source, such as the sound of a battle tank, which emits a sound different from regular wheeled vehicles, transverse forces on the droppable unit are generated via a passive acoustic sensor depending on the sensor signals.

A weapon system for guided pin-point attack of multiple targets is shown in DE 28 29 934 A1. The projectile better positioned for a particular target is selected through computer analysis, turned to firing position and fired at the target with a defined lateral lead.

A sensor arrangement in a seeker head is described in DE 33 42 958 C2, which corresponds to U.S. Pat. No. 4,619,421. The sensor is articulated via coupling rods to a biaxial outer gimbal system offset axially behind it for movement of the sensor relative to the seeker head. The sensor as well as the outer gimbal system are each held in a spherical surface pairing.

DE 198 45 611 A1 describes a projectile as well as a method for correcting the trajectory. Here a magnetic field sensor is used to recognize the roll attitude of the correcting unit.

Methods for determining the roll attitude of a rolling flying object can be found in EP 0 745 828 B1, which corresponds to U.S. Pat. No. 5,740,986 as well as in EP 0 742 420 B1, which corresponds to U.S. Pat. No. 5,896,106, which are all incorporated herein by reference.

SUMMARY OF THE INVENTION

It is an object of the invention to provide a method which permits an effective use of projectiles during an optimal engagement of the target.

Often salvos/bursts of fire are fired to increase the probability of hits, in particular in the medium caliber range, so that usually only a cluster correction is performed, i.e. all projectiles receive a blanket correction. In the AHEAD methods, the fuse timer of each projectile is set at the muzzle end in order for the projectile to eject its pay load, such as tungsten sub-ammunition, shortly before the target and destroys it.

The invention, thus, is based on the idea of addressing each individual projectile, in particular after a firing burst (sustained firing or fast individual firing) separately and, in doing so, pass additional information to the individual projectile about the direction of the earth's magnetic field. The characterization of the projectile is based on the principle of beam riding guidance for projectiles. Each projectile reads only the guidance beam identified for it and can, using additional information, determine its absolute roll attitude in space in order to achieve the proper triggering of its correcting pulses. This characterization, for example, following the AHEAD-method, is transferred to the projectile via an induction coil at the muzzle of the barrel, see for example CH 691 143 A5, which is incorporated herein by reference. Alternative possibilities of transfers, for example via microwave transmitter, are known to experts, e.g., from EP 1 726 911 A1, which corresponds to U.S. Publication No. 2007/0074625, which is incorporated herein by reference.

Based on the known fact that terminally guided projectiles cannot determine their position in space as they are in free fall and therefore do not detect gravity, use of a magnetic sensor is provided. While it can measure the earth's magnetic field and determine the magnetic field lines, this information alone is not sufficient, since the direction of the magnetic field line on the one hand depends on the position on the globe and on the other hand on the direction of the ballistic trajectory line of fire. As a further development, therefore, the ammunition or projectiles are also "imprinted" with the local direction of the earth's magnetic field, when the fuse timing for the ammunition is set. This "imprinting" can occur at various positions, such as in the weapon, in the barrel or during flight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE illustrates a projectile according to an embodiment of the invention.

DETAILED DESCRIPTION

The only FIGURE shows the essential parts of a projectile 1 for the implementation of the idea. In this example, the projectile incorporates a tail sensor 2, a magnetic field sensor 3, explosives 4, as well as at least an ejection element 5, as a correction impulse propulsion unit 6. 7 identifies an analysis device which is functionally connected to the other assemblies.

The function is as follows:

The magnetic sensor 3 recognizes the rotational speed (roll rate) of the projectile 1 and the direction of the magnetic field relative to projectile 1. Through the previously determined declination angles of the earth's magnetic field from the vertical direction of the earth's gravity field, the geostationary roll attitude of projectile 1 can be determined in the analysis device 7. Via the now carried out "imprinting", for example when projectile 1 passes the muzzle, projectile 1 or the analysis unit 7, respectively, during flight recognizes its individual deviation using the guidance beam specifically generated for projectile 1. The guidance beam itself, for example, is emitted from the firing location. Now projectile 1 corrects its actual trajectory to the intended trajectory by initiating the correction impulse propulsion unit(s) 6 in the known fashion.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for flight trajectory correction of a terminally guided ammunition fired from a weapon barrel or similar device having at least one sensor for receiving information and at least one correction impulse propulsion unit, the method comprising:
    imprinting an individual guidance beam with a local direction of earth's magnetic field when setting a fuse timing of the ammunition;
    recognizing via a magnetic field sensor a direction of the earth's magnetic field relative to the ammunition;
    determining a roll attitude of the ammunition in an analysis unit, while the sensor recognizes the individual guidance beam and therefore a deviation of the ammunition; and
    based on information in the analysis unit, the correction impulse propulsion unit is initiated.

2. The method according to claim 1, wherein the guidance beam is a laser beam.

3. The method according to claim 1, wherein imprinting in the weapon takes place while the ammunition is passing through the weapon barrel or in flight.

4. The method according to claim 3, wherein the imprinting takes place by subsequent transmission of microwaves.

5. The method according to claim 1, wherein the ammunition is fired in salvos.

* * * * *

UNITED STATES PATENT AND TRADEMARK OFFICE
CERTIFICATE OF CORRECTION

PATENT NO. : 8,288,698 B2
APPLICATION NO. : 12/789607
DATED : October 16, 2012
INVENTOR(S) : Seidensticker Page 1 of 1

It is certified that error appears in the above-identified patent and that said Letters Patent is hereby corrected as shown below:

Title Page item (73) Assignee should read: Rheinmetall Air Defence AG, Zurich [[(DE)]] (CH)

Signed and Sealed this
Fourth Day of December, 2012

David J. Kappos
*Director of the United States Patent and Trademark Office*